US 12,172,872 B2

(12) United States Patent
Yamauchi

(10) Patent No.: US 12,172,872 B2
(45) Date of Patent: Dec. 24, 2024

(54) CRANE, AND PATH GENERATION SYSTEM FOR CRANE

(71) Applicant: TADANO LTD., Kagawa (JP)

(72) Inventor: Hiroshi Yamauchi, Kagawa (JP)

(73) Assignee: TADANO LTD., Kagawa (JP)

( * ) Notice: Subject to any disclaimer, the term of this patent is extended or adjusted under 35 U.S.C. 154(b) by 605 days.

(21) Appl. No.: 17/428,875

(22) PCT Filed: Feb. 5, 2020

(86) PCT No.: PCT/JP2020/004393
§ 371 (c)(1),
(2) Date: Aug. 5, 2021

(87) PCT Pub. No.: WO2020/166454
PCT Pub. Date: Aug. 20, 2020

(65) Prior Publication Data
US 2022/0106168 A1 Apr. 7, 2022

(30) Foreign Application Priority Data

Feb. 14, 2019 (JP) ................. 2019-024951

(51) Int. Cl.
*B66C 13/48* (2006.01)
*B66C 13/46* (2006.01)
*G05D 1/00* (2006.01)

(52) U.S. Cl.
CPC .............. *B66C 13/48* (2013.01); *B66C 13/46* (2013.01); *G05D 1/10* (2013.01)

(58) Field of Classification Search
CPC ............ B66C 13/48; B66C 13/46; G05D 1/10
See application file for complete search history.

(56) References Cited

U.S. PATENT DOCUMENTS 5,806,696 A * 9/1998 Hytonen ................. B66C 13/54
212/270
5,823,369 A * 10/1998 Kuromoto .............. B25J 9/1638
212/223

(Continued)

FOREIGN PATENT DOCUMENTS

JP 2017-146710 A 8/2017

OTHER PUBLICATIONS

Taghaddos et al. Automated Crane Planning and Optimization for modular construction, Aug. 31, 2018, Elsevier, pp. 219-232 (Year: 2018).*

(Continued)

*Primary Examiner* — Sze-Hon Kong
(74) *Attorney, Agent, or Firm* — Paratus Law Group, PLLC

(57) ABSTRACT

A crane in which a boom that is capable of derricking and extending/retracting is provided to a swiveling base includes: an operable-range-setting unit that sets an operable range in which a load being transported can be transported, the operable range being set according to the weight of the load; a path generation unit that generates, within the set operable range, a plurality of nodes through which the load can pass and a plurality of paths connecting adjacent nodes; and a transport path determination unit that determines a transport path of the load on the basis of a priority sequence for actuating a plurality of actuators of the crane, the transport path satisfying a prescribed condition, and being determined from the generated plurality of nodes and plurality of paths.

2 Claims, 9 Drawing Sheets

(56) References Cited

U.S. PATENT DOCUMENTS

| | | | | |
|---|---|---|---|---|
| 7,831,333 B2* | 11/2010 | Sawodny | ................ | B66C 23/94 700/218 |
| 8,190,288 B2* | 5/2012 | Rohrauer | ........... | G05B 19/4086 700/230 |
| 11,084,691 B2* | 8/2021 | Palberg | ................. | B66C 13/063 |
| 2003/0076480 A1* | 4/2003 | Burbulla | ............... | B66F 11/048 396/419 |
| 2003/0214415 A1* | 11/2003 | Shaw | ...................... | B66C 15/06 340/685 |
| 2004/0164041 A1* | 8/2004 | Sawodny | .............. | B66C 13/085 212/273 |
| 2005/0098768 A1* | 5/2005 | Malek | .................. | B66C 15/065 254/267 |
| 2007/0219662 A1* | 9/2007 | Sawodny | ................ | B66C 13/04 700/213 |
| 2008/0053945 A1* | 3/2008 | Schneider | ............. | B66C 15/045 212/270 |
| 2008/0162005 A1 | 7/2008 | Tang et al. | | |
| 2009/0008351 A1* | 1/2009 | Schneider | ............. | B66C 13/46 212/278 |
| 2010/0264106 A1* | 10/2010 | Kawai | ..................... | B66C 23/94 212/276 |
| 2011/0006025 A1* | 1/2011 | Schneider | ............. | B66C 13/063 212/284 |
| 2011/0278252 A1* | 11/2011 | De Carvalho Cal | ... | B66C 13/16 701/50 |
| 2013/0345857 A1* | 12/2013 | Lee | ......................... | B66C 13/48 700/229 |
| 2015/0012188 A1* | 1/2015 | Scheider | ................. | B66C 13/40 701/50 |
| 2016/0031680 A1* | 2/2016 | Delplace | ................. | B66C 13/16 703/7 |
| 2016/0034730 A1* | 2/2016 | Delplace | ............ | G06K 7/10366 340/8.1 |
| 2016/0247067 A1* | 8/2016 | Cai | ........................ | G06Q 50/40 |
| 2016/0318739 A1* | 11/2016 | Terata | ................... | B66C 15/065 |
| 2017/0088402 A1* | 3/2017 | Ikeda | .................... | B66C 23/701 |
| 2018/0346294 A1* | 12/2018 | Shely | ................... | B66C 23/905 |
| 2019/0084808 A1* | 3/2019 | Hartmann | ............... | B66C 13/46 |
| 2019/0302794 A1* | 10/2019 | Kean | ....................... | E02F 9/262 |
| 2019/0308851 A1* | 10/2019 | Gustafsson | ............. | B66C 23/48 |
| 2021/0072727 A1* | 3/2021 | Stanger | ................... | B66C 15/04 |
| 2021/0206605 A1* | 7/2021 | Rotem | .................... | B66C 13/48 |
| 2021/0215139 A1* | 7/2021 | Roodenburg | ........... | B66C 13/06 |
| 2021/0269285 A1* | 9/2021 | Irle | ......................... | G01S 19/51 |
| 2021/0347614 A1* | 11/2021 | Bramberger | ............ | E04G 21/16 |
| 2022/0081873 A1* | 3/2022 | Huissoon | ................ | E02F 9/205 |

OTHER PUBLICATIONS

Sawodny e tal., Actual Trends in Crane Automation—Directions for the Future, 2009, Faculty of Mechanical Engineering, pp. 167-174 (Year: 2009).*

Cai et al., Parallel genetic algorithm based automatic path planning for crane lifting in complex environments, Automation in Construction 62 (2016) pp. 133-147 (Year: 2016).*

Zhang et al., Improving lifting motion planning and re-planning of cranes with consideration for safety and efficiency, Advanced Engineering Informatics 26 (2012) pp. 396-410 (Year: 2012).*

Oct. 24, 2022, European Search Report issued for related EP Application No. 20755678.8.

Apr. 7, 2020, International Search Report issued for related PCT application No. PCT/JP2020/004393.

Apr. 7, 2020, International Search Opinion issued for related PCT application No. PCT/JP2020/004393.

* cited by examiner

CRANE, AND PATH GENERATION SYSTEM FOR CRANE

CROSS REFERENCE TO PRIOR APPLICATION

This application is a National Stage Patent Application of PCT International Patent Application No. PCT/JP2020/004393 (filed on Feb. 5, 2020) under 35 U.S.C. § 371, which claims priority to Japanese Patent Application No. 2019-024951 (filed on Feb. 14, 2019), which are all hereby incorporated by reference in their entirety.

TECHNICAL FIELD

The present invention relates to a crane and a path generation system for a crane.

BACKGROUND ART

In the related art, in a transport operation of a load by a crane, the load is moved in a three-dimensional space by using one or both of movements such as swiveling, derricking, and extension and retraction of a boom, and winding-up of a wire rope. A transport path of the load is determined in consideration of a posture of the crane, a position and a shape of a feature, and a shape, a lifting position, and a suspending position of the load.

The transport path of the load can be arbitrarily set within as operable range of the crane. Since the crane moves the load by a combination of movements of actuators, the load can be moved by different combinations even in the same transport path. Thus, an operator is required to have a lot of experience and a high degree of skill in determining an optimum transport path and determining the combination of the movements of the actuators. Accordingly, a transport plan generation device that generates a transport plan with high accuracy is known. For example, Patent Literature 1 is exemplified.

The transport plan generation device described in Patent Literature 1 divides a three-dimensional measurement space into a plurality of divided spaces and constructs a divided-space network connecting the divided spaces. The transport plan generation device searches for a transport path from the divided-space network. With such a configuration, the transport plan generation device can generate a shortest transport path by repeating a linear movement between the divided spaces. However, in the crane, since actuation speeds of the actuators are different, the shortest transport path may not be the shortest transport time. There is a case where the load cannot be transported on the shortest transport path depending on the actuation condition of the actuator of the crane.

CITATION LIST

Patent Literature

Patent Literature 1: JP 2017-146710 A

SUMMARY OF THE INVENTION

Problems to be Solved by the Invention

Provided are a crane and a path generation system for a crane capable of transporting a load along an optimum transport path in consideration of an actuation condition of an actuator.

Solutions to Problems

The problem to be solved by the present invention is as described above, and solutions to problems will be described below.

That is, a crane of the present invention is a crane in which a boom capable of derricking and extending/retracting is provided at a swiveling base. The crane includes an operable-range-setting unit that sets an operable range in which a load to be transported is capable of being transported from a weight of the load, a path generation unit that generates a plurality of nodes through which the load is able to pass and a plurality of paths connecting the nodes adjacent to each node within the set operable range, a transport path determination unit that determines a transport path of the load satisfying a prescribed condition based on an actuation priority sequence of a plurality of actuators of the crane from the plurality of generated nodes and the plurality of generated paths, and a transport control unit that transports the load along the determined transport path.

In the crane of the present invention, the transport path determination unit determines the priority sequence by a maximum transport speed of the load by the actuator.

In the crane of the present invention, the transport path determination unit determines the priority sequence by actuation cost of the actuator.

In the crane of the present invention, the transport path determination unit determines the transport path by using, as the prescribed condition, a combined actuation of two or more actuators selected from among the plurality of actuators or an independent actuation of each actuator selected from among the plurality of actuators.

A path generation system for a crane of the present invention is a path generation system in which a boom capable of derricking and extending/retracting is provided at a swiveling base. The system includes an information communication unit that acquires positional information of the crane, machine body information of the crane, a lifting position and a suspending position of a load, and a weight of the load, and transmits a transport path of the load, an operable-range-setting unit that sets an operable range in which the load is capable of being transported from the weight of the load, a path generation unit that generates a plurality of nodes through which the load is able to pass and a plurality of paths connecting the nodes adjacent to each node in the set operable range, and a transport path determination unit that determines a transport path of the load satisfying a prescribed condition based on an actuation priority sequence of a plurality of actuators of the crane from the plurality of generated nodes and the plurality of generated paths.

Effects of the Invention

The present invention has the following effects.

According to the crane of the present invention, the paths generated within the operable range are connected, and the transport path satisfying the prescribed condition is determined by using the actuator with a high priority sequence. Accordingly, it is possible to transport the load along the optimum transport path in consideration of the actuation condition of the actuator.

According to the crane of the present invention, the transport path through which the load is transported co the suspending position in the shortest time is determined by using the actuator with a high priority sequence. Accordingly, it is possible to transport the load along the optimum transport path in consideration of the actuation condition of the actuator.

According to the crane of the present invention, the transport path through which the load is transported to the suspending position at the minimum cost (minimum fuel consumption) is determined by using the actuator with the high priority sequence. Accordingly, it is possible to transport the load along the optimum transport path in consideration of the actuation condition of the actuator.

According to the crane of the present invention, the transport path corresponding to the actuation timing is determined by using the actuator with a high priority sequence. Accordingly, it is possible to transport the load along the optimum transport path in consideration of the actuation condition of the actuator.

In the path generation system for a crane of the present invention, the transport path satisfying the prescribed condition is determined by using the actuator having a high priority sequence by connecting the paths generated within the operable range. Accordingly, it is possible to transport the load along the optimum transport path in consideration of the actuation condition of the actuator.

BRIEF DESCRIPTION OF DRAWINGS

FIG. 4A is a diagram illustrating a distribution of nodes viewed from above the crane, and FIG. 4B is a diagram illustrating a distribution of nodes viewed from a side of the crane.

FIG. 5A is a diagram illustrating nodes and paths for each derricking angle, FIG. 1B is a diagram illustrating nodes and paths for each swiveling angle, and FIG. 5C is a diagram illustrating nodes and paths for each boom length.

FIG. 7A is a diagram illustrating a difference in the transport path due to a length of the path at the same swiveling radius, and FIG. 7B is a diagram illustrating a difference in the transport path due to a difference in the swiveling radius.

DESCRIPTION OF EMBODIMENTS

Figure 1:
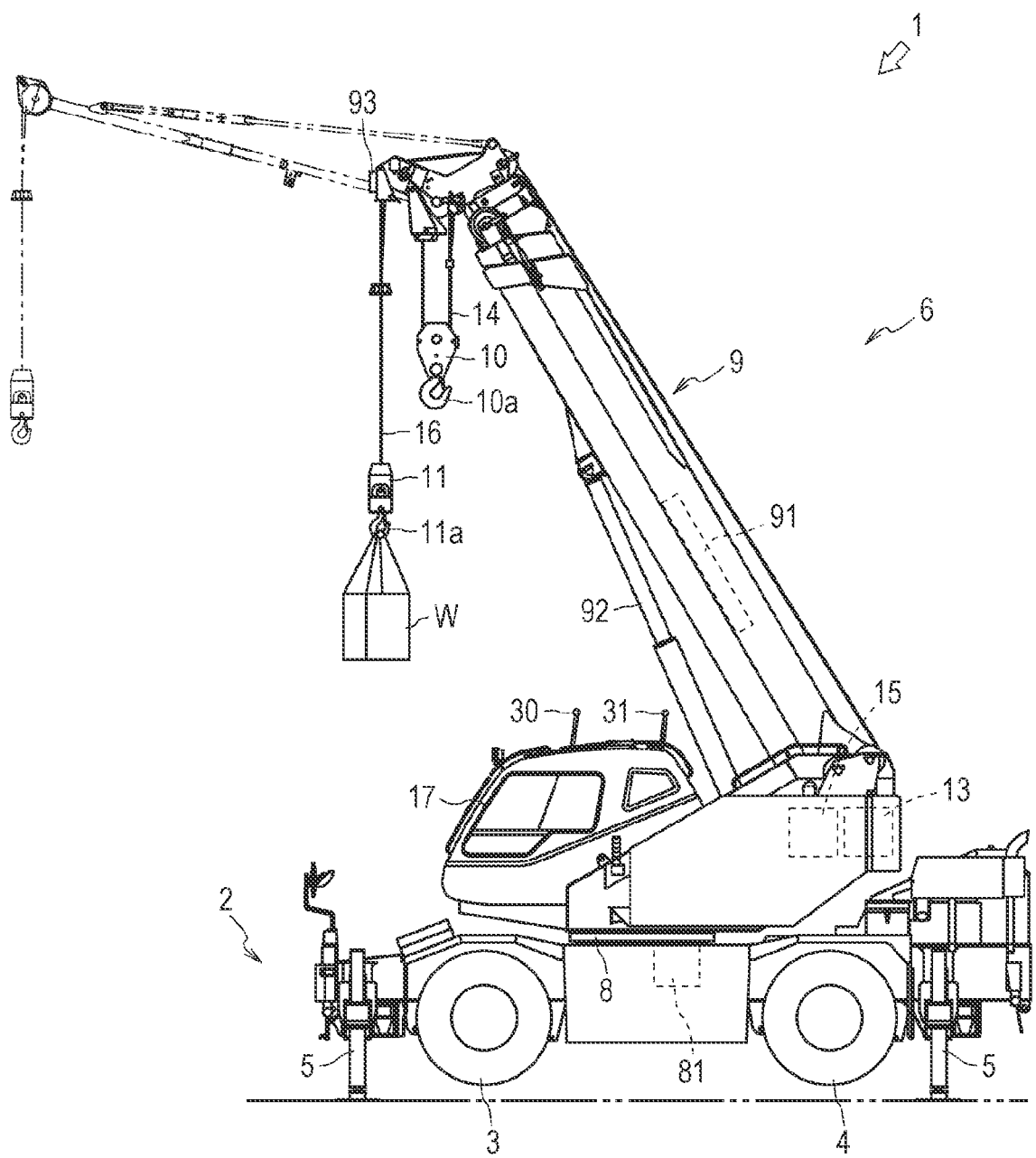
FIG. 1 is a side view illustrating an overall configuration of a crane.
Figure 2:
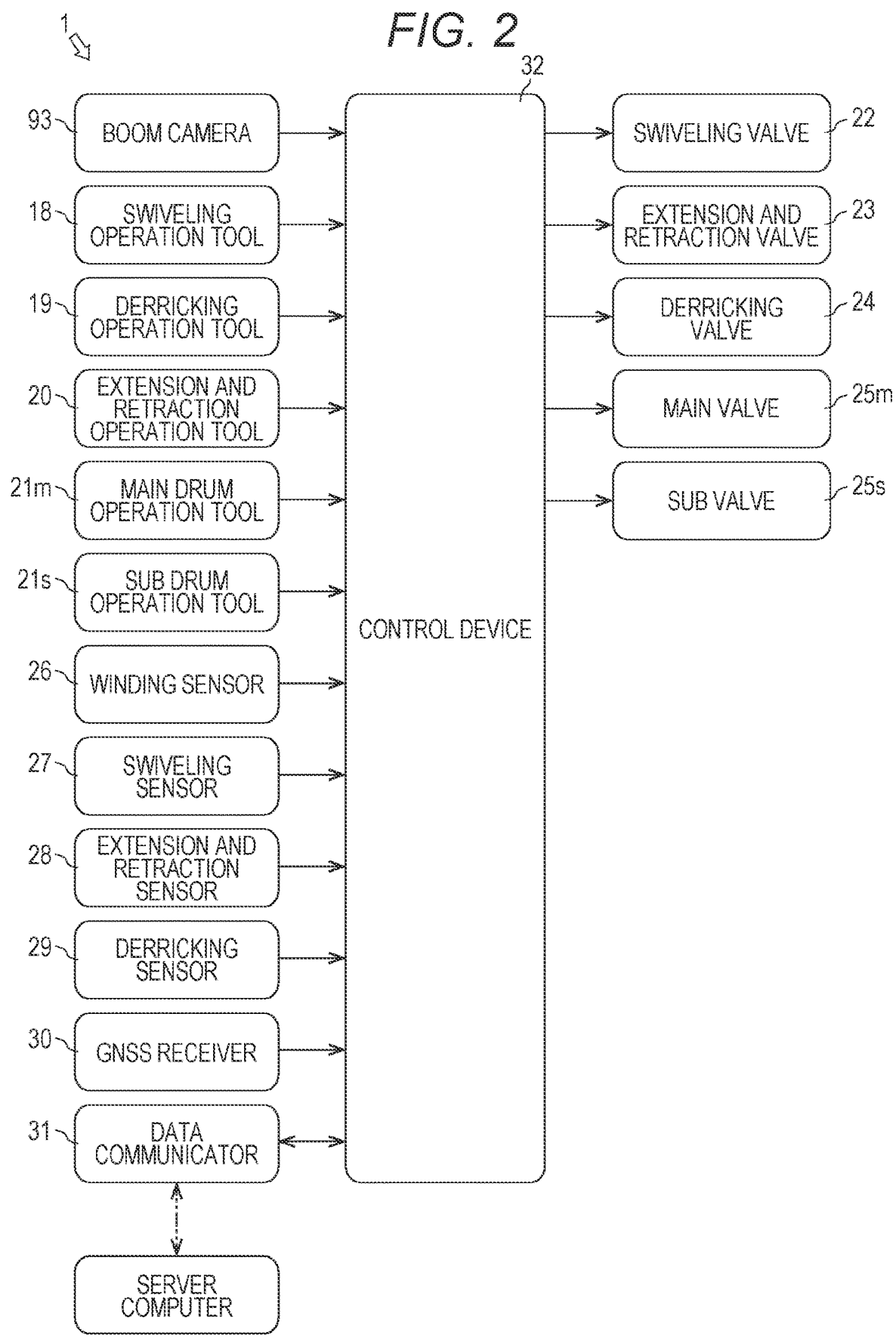
FIG. 2 is a block diagram illustrating a control configuration of the crane.

Hereinafter, a crane 1 will be described with reference to FIGS. 1 and 2. In the present application, although a rough-terrain crane will be described, the technical idea disclosed in the present application can also be applied to an all-terrain crane, a truck crane, a truck loader crane, a high-place work vehicle, and the like.

The crane 1 includes a vehicle 2 and a crane device 6.

The vehicle 2 includes a pair of left and right front wheels 3 and a pair of left and right rear wheels 4. The vehicle 2 includes an outrigger 5 that is brought into contact with the ground to achieve stability when a load W is transported. The vehicle 2 supports the crane device 6 on an upper portion.

The crane device 6 lifts the load W with a wire rope. The crane device 6 includes a swiveling base 8, a boom 9, a main hook block 10, a sub hook block 11, a main winch 13, a main wire rope 14, a sub winch 15, a sub wire rope 16, and a cabin 17.

The swiveling base 8 is a structure configured to be able to swivel the crane device 6. The swiveling base 8 is provided at a frame of the vehicle 2 via as annular bearing. A swiveling hydraulic motor 81 which is an actuator is provided at the swiveling base 8. The swiveling base 8 is configured to be able to be swiveled in a left-right direction by the swiveling hydraulic motor 81.

The swiveling hydraulic motor 81 is rotationally operated by a swiveling valve 22 that is an electromagnetic proportional switching valve. The swiveling valve 22 can control a flow rate of hydraulic oil to be supplied to the swiveling hydraulic motor 81 to any flow rate. That is, the swiveling base 8 is configured to be controllable to any swiveling speed via the swiveling hydraulic motor 81 that is rotationally operated by the swiveling valve 22. A swiveling sensor 27 that detects a swiveling angle and a swiveling speed of the swiveling base 8 is provided at the swiveling base 8.

The boom 9 is a structure configured to be able to lift the load W. A base end of the boom 9 is swingably provided substantially at a center of the swiveling base 8. An extension and retraction hydraulic cylinder 91 and a derricking hydraulic cylinder 92 which are actuators are provided at the boom 9. The boom 9 is configured to be extendable and retractable in a longitudinal direction by the extension and retraction hydraulic cylinder 91. The boom 9 is configured to be able to derrick in an up-down direction by the derricking hydraulic cylinder 92. A boom camera 93 is provided at the boom 9.

The extension and retraction hydraulic cylinder 91 is telescopically operated by an extension and retraction valve 23 that is an electromagnetic proportional switching valve. The extension and retraction valve 23 can control a flow rate of hydraulic oil to be supplied to the extension and retraction hydraulic cylinder 91 to any flow rate. That is, the boom 9 is configured to be controllable to an arbitrary extension and retraction speed via the extension and retraction hydraulic cylinder 91 telescopically operated by the extension and retraction valve 23. An extension and retraction sensor 28 that detects a boom length and an extension and retraction speed of the boom 9 is provided at the boom 9.

The derricking hydraulic cylinder 92 is telescopically operated by a derricking valve 24 that is an electromagnetic proportional switching valve. The derricking valve 24 can control a flow rate of hydraulic oil to be supplied to the derricking hydraulic cylinder 92 to any flow rate. That is, the boom 9 is configured to be controllable to an arbitrary derricking speed via the derricking hydraulic cylinder 92 that is telescopically operated by the derricking valve 24. A derricking sensor 29 that detects a derricking angle and a derricking speed of the boom 9 is provided at the boom 9.

The boom camera 93 acquires images of the load W and the periphery of the load W. The boom camera 93 is provided at a distal end of the boom 9. The boom camera 93 is configured to be rotatable by 360°, and can capture images in all directions around the distal end of the boom 9. The boom camera 93 is connected to a control device 32 to be described later.

The main hook block 10 and the sub hook block 11 are members for lifting the load W. A main hook block 10a is provided at the main hook block 10. A sub hook 11a is provided at the sub hook block 11.

The main winch 13 and the main wire rope 14 are mechanisms for lifting the load W hooked on the main hook 10a. The sub winch 15 and the sub wire rope 16 are mechanisms for lifting the load W hooked on the sub hook 11a. A winding sensor 26 that detects rotation amounts is provided in the main winch 13 and the sub winch 15. The main winch 13 is configured to be operable at an arbitrary winding speed and an arbitrary unwinding speed by controlling a main hydraulic motor by a main valve 25m that is an electromagnetic proportional switching valve. Similarly, the sub winch 15 is configured to be operable at an arbitrary winding speed and an arbitrary unwinding speed by controlling a sub hydraulic motor by a sub valve 25s that is an electromagnetic proportional switching valve.

The cabin 17 is a structure that covers a cockpit. An operation tool for operating the vehicle 2 and an operation tool for operating the crane device 6 are provided in the cabin 17. A swiveling operation tool 18 can operate the swiveling hydraulic motor 81. A derricking operation tool 19 can operate the derricking hydraulic cylinder 92. An extension and retraction operation tool 20 can operate the extension and retraction hydraulic cylinder 91. A main drum operation tool 21m can operate the main hydraulic motor. A sub drum operation tool 21s can operate the sub hydraulic motor.

A GNSS receiver 30 receives a ranging wave from a satellite, and calculates latitude, longitude, and altitude. The GNSS receiver 30 is provided in the cabin 17. Accordingly, the crane 1 can acquire position coordinates of the cabin 17. It is possible to acquire an azimuth based on the vehicle 2. The GNSS receiver 30 is connected to the control device 32 to be described later.

A data communicator 31 is a device that communicates with an external server computer. The data communicator 31 is provided in the cabin 17. The data communicator 31 is configured to acquire space information of an operation area Aw to be described later, information on a transport work, and the like from the external server computer. The data communicator 31 is connected to the control device 32 to be described later.

The control device 32 is a computer that controls various switching valves (the swiveling valve 22, the extension and retraction valve 23, the derricking valve 24, the main valve 25m, and the sub valve 25s). The control device 32 stores various programs and data for controlling various switching valves (22, 23, 24, 25m, and 25s). The control device 32 is connected to various sensors (the winding sensor 26, the swiveling sensor 27, the extension and retraction sensor 28, and the derricking sensor 29). The control device 32 is connected to various operation tools (the swiveling operation tool 18, the derricking operation tool 19, the extension and retraction operation tool 20, the main drum operation tool 21m, and the sub drum operation tool 21s). Thus, the control device 32 can generate control signals corresponding to operation amounts of the various operation tools (18, 19, 20, 21m, and 21s).

The crane 1 having the aforementioned configuration can move the crane device 6 to any position by causing the vehicle 2 to run. The crane 1 can expand a lifting height and a work radius of the crane device 6 by raising the boom 9 and extending the boom 9. The crane 1 can move the load W by using the movement such as the swiveling, the derricking, and the extension and retraction of the boom 9 and the winding of the wire ropes (the main wire rope 14 and the sub wire rope 16) alone or in combination.

Next, automatic generation of a transport path CR of the load W within an operable range Ar of the operation area Aw of the crane 1 will be described with reference to FIGS. 3 to 7. It is assumed that the crane 1 is disposed in the operation area Aw such as a construction site. It is assumed that the crane 1 automatically transports the load N suspended by the sub hook lid along the generated transport path CR. In the following description, positional information is position coordinate data of the crane 1. Machine body information is performance specification data of the crane 1. Control information is an operation state of the crane 1, a control signal, detection values of various sensors, and the like. Information regarding an operation is information regarding a lifting position Ps of the load W, a suspending position Pe of the load W, a weight Wg of the load W, and the like. Transport path information is the transport path CR, a transport speed, and the like of the load W. The space information of the operation area Aw is three-dimensional information of a feature, a building, or the like in the operation area Aw.

Figure 3:
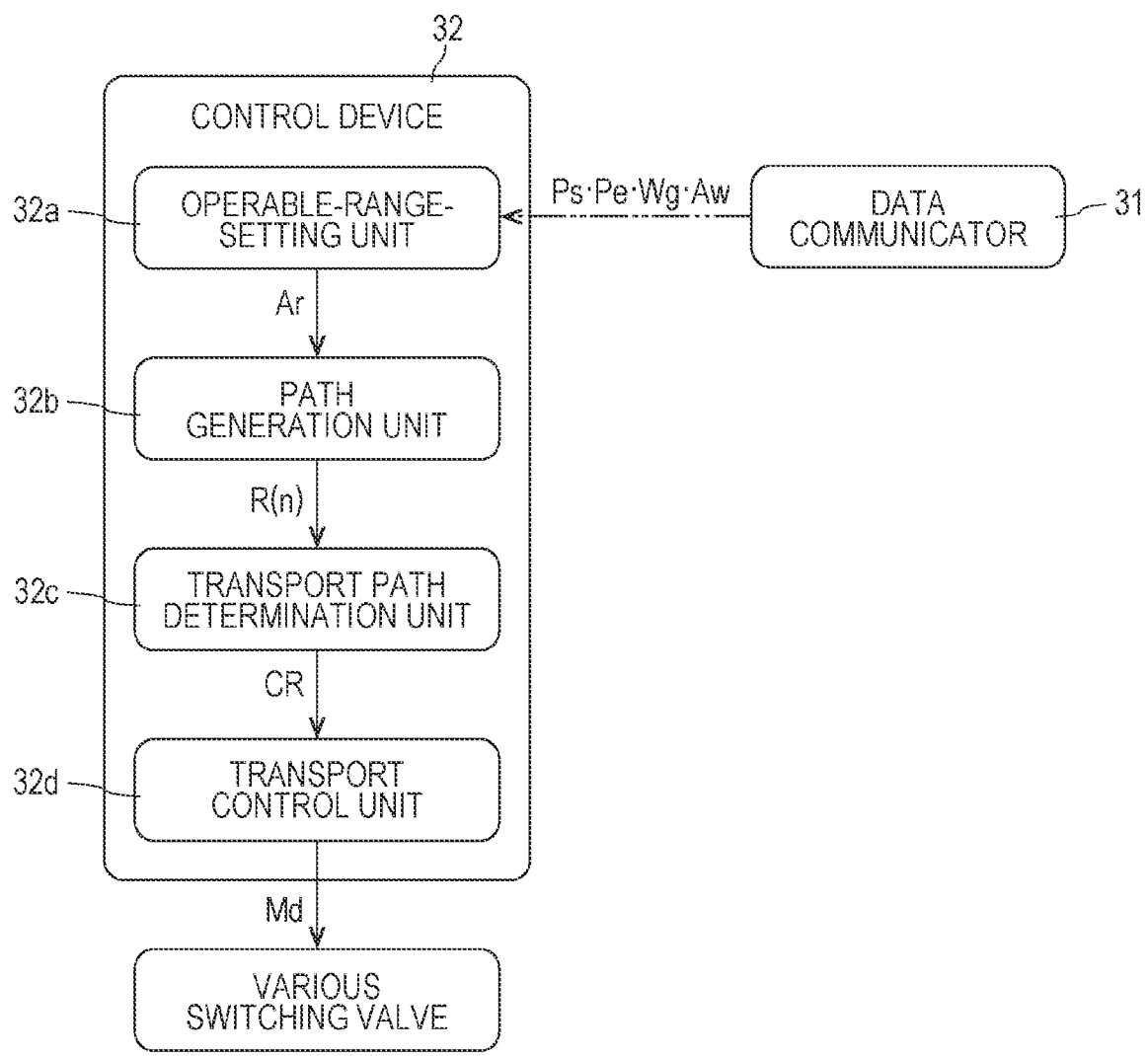
FIG. 3 is a block diagram illustrating a control configuration of path generation in a control device.

As illustrated in FIG. 3, the crane 1 automatically generates the transport path CR of the load W in the control device 32. The control device 32 includes an operable-range-setting unit 32a, a path generation unit 32b, a transport path determination unit 32c, and a transport control unit 32d.

The operable-range-setting unit 32a of the control device 32 sets the operable range Ar on a virtual space from the weight Wg of the load W to be transported. The operable-range-setting unit 32a acquires, as the information regarding the operation from the external server computer or the like via the data communicator 31, the lifting position Ps, the suspending position Pe, the weight Wg of the load W, and the space information of the operation area Aw (see FIGS. 4A and 4B). The operable-range-setting unit 32a calculates the operable range Ar (see FIGS. 4A and 4B) which is a space in which the crane 1 can transport the load W from the machine body information of the crane 1 and the weight Wg of the load W. The operable-range-setting unit 32a sets, as the operable range Ar, a space from which a feature and a building are excluded based on the acquired space information of the operation area Aw.

As illustrated is FIGS. 4A, 4B, 5A, 5B, and 5C, the path generation unit 32b of the control device 32 generates all paths R(n) through which the load W can pass within the operable range Ar. For example, the path R(n) connects a plurality of nodes P(n) through which the load F suspended in a state in which the sub wire rope 16 is wound up the most can pass. The path R(n) is represented by three-dimensional coordinates of the connected node P(n). The load W may be transported by derricking of a jib and winding up and winding down by the main winch 13 and the sub winch 15.

Figure 4A:
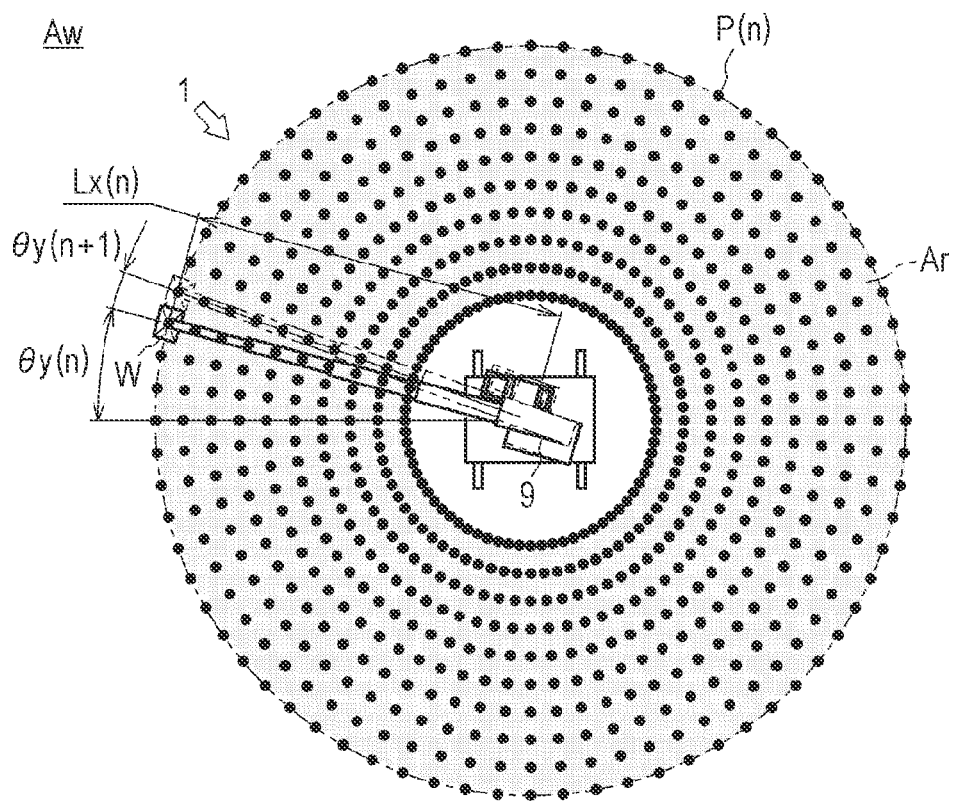
FIGS. 4A and 4B are diagrams illustrating a distribution of nodes.
Figure 4B:
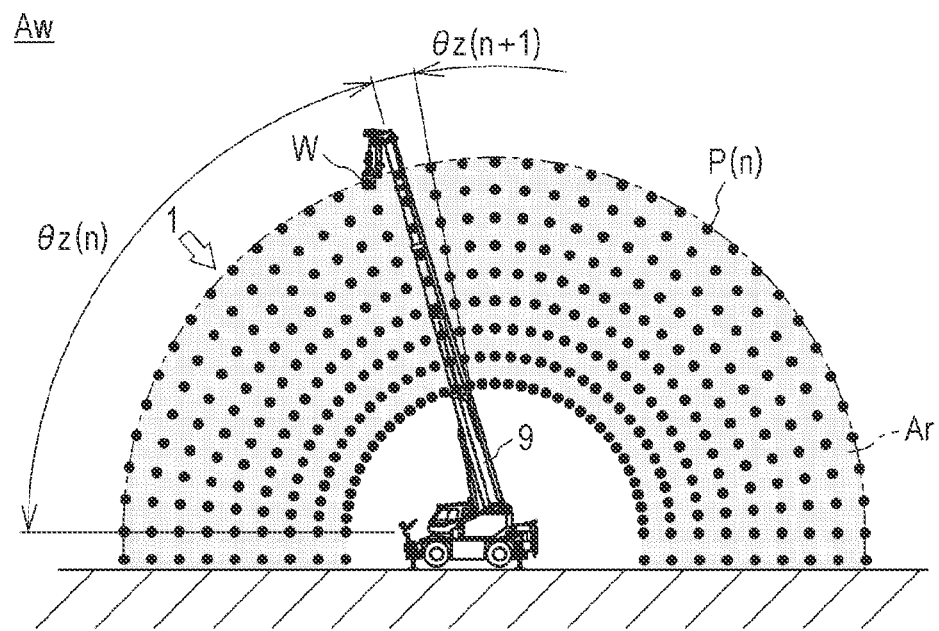

As illustrated in FIGS. 4A and 4B, in a polar coordinate system with a swiveling center of the boom 9 as an origin, the path generation unit 32b generates, in the virtual space, the node P(n) through which the load W passes when an arbitrary boom length $Lx(n)$, an arbitrary swiveling angle $\theta y(n)$, and as arbitrary derricking angle $\theta z(n)$ of the boom 9 are changed in the operable range Ar for each prescribed arbitrary boom length interval, for each arbitrary swiveling angle interval, and for each arbitrary derricking angle interval (n is an arbitrary natural number).

The path generation unit 32b generates the node P(n) when the boom 9 at a position of an arbitrary swiveling angle $\theta y(n)$ in a clockwise direction with a traveling direction of the vehicle 2 as a reference and an arbitrary derricking angle $\theta z(n)$ with a horizontal direction as a reference is extended and retracted for arbitrary boom length interval in the entire range of the boom length $Lx(n)$ with which the boom can extend and retract. Subsequently, the node generation unit 32b generates the node P(n) in the entire range of the boom length Lx(n) with which the boom can extend and retract when the boom 9 at a position of an arbitrary swiveling angle θy(n+1) different by an arbitrary swiveling angle interval and an arbitrary derricking angle θz(n) is extended and retracted for each arbitrary boom length interval. As described above, the node generation unit 32b generates the node P(n) when the boom 9 at a position of an arbitrary derricking angle θz(n) is extended and retracted for each arbitrary swiveling angle interval in the entire range of the swiveling angle θy(n) at which the boom can swivel.

Similarly, the path generation unit 32b generates the node P(n) when the boom 9 at a position of an arbitrary derricking angle θn(n+1) different by an arbitrary swiveling angle interval is extended and retracted for each arbitrary boom length interval for each arbitrary swiveling angle interval in the entire range, of the swiveling angle θy(n) at which the boom can swivel. As described above, the node generation unit 32b generates the node P(n) for each arbitrary swiveling angle interval in the entire range of the swiveling angle θy(n) at which the boom can swivel, for each arbitrary derricking angle interval in the entire range of the derricking angle θz(n) at which the boom can derrick, and for each arbitrary boom length interval in the entire range of the boom length Lx(n) with which the boom can extend and retract. As a result, in the operable range Ar, the node P(n) of the boom 9 at an arbitrary boom length Lx(n), an arbitrary swiveling angle θy(n), and an arbitrary derricking angle θz(n) is generated for each arbitrary swiveling angle interval, for each arbitrary derricking angle interval, and for each arbitrary boom length interval.

Subsequently, the path generation unit 32b generates the path R(n) between the nodes P(n) by connecting the nodes P(n) at adjacent positions among the generated nodes P(n) within the operable range Ar (see FIGS. 5A, 5B, and 5C). The path generation unit 32b specifies a plurality of other nodes P(n+1), P(n+2), . . . adjacent to an arbitrary one node P(n) as nodes capable of moving the load W from the one node P(n). The path generation unit 32b generates path R(n), R(n+1), . . . from one node P(n) to the plurality of other adjacent nodes P(n+1), P(n+2), . . . . The path generation unit 32b generates a path network that covers a space in the operable range Ar by Generating the paths R(n) between all the nodes P(n).

Figure 5A:
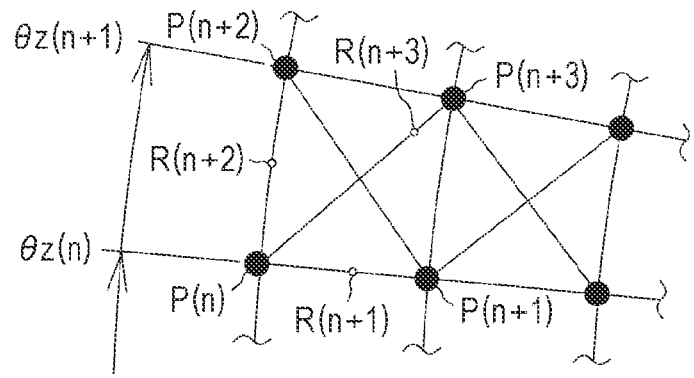
FIGS. 5A to 5C are diagrams illustrating nodes and paths.

As illustrated in FIG. 5A, at an arbitrary swiveling angle θy(n), the path generation unit 32b generates the paths connecting the node P(n) and the node P(n+1) generated in the retraction order of the boom 9 at the derricking angle θz(n) for each arbitrary boom length interval and the node P(n+2) and the node P(n+3) of the load W generated in The retraction order of the boom 9 at the derricking angle θz(n+1) for each arbitrary boom length interval.

The path R(n+1) connecting the node P(n) and the node P(n+1) is a path through which the load W passes by the extending and retracting of the boom 9. The path R(n+2) connecting the node P(n) and the node P(n+2) is a path through which the load W passes by the derricking of the boom 9. The path R(n+3) connecting the node P(n) and the node P(n+3) is a path through which the load W passes by extending and retracting and derricking the boom 9.

Figure 5B:
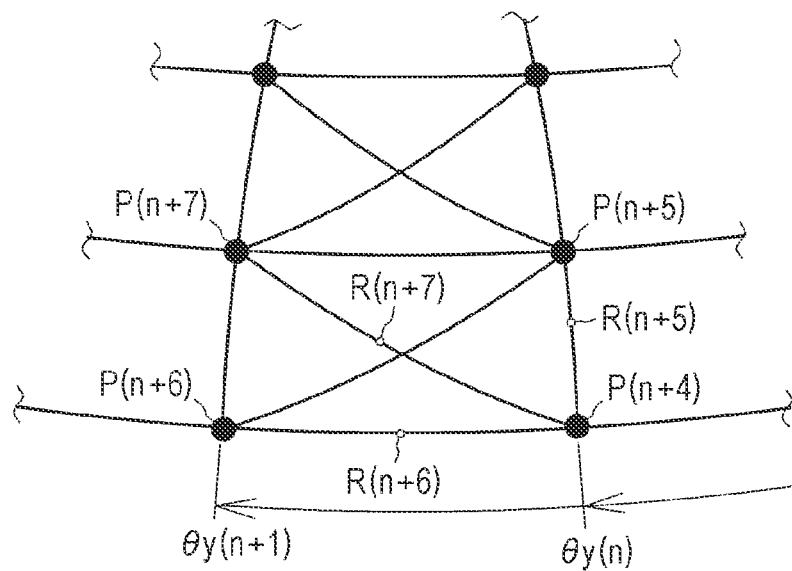

In addition, as illustrated in FIG. 5B, at the arbitrary boom length Lx(n), the path generation unit 32b generates the paths connecting the node P(n+4) and the node P(n+5) of the load W generated by raising the boom 9 at the swiveling angle θy(n) for each arbitrary derricking angle interval and the node P(n+6) and the node P(n+7) of the load W generated by raising the boom 9 at the swiveling angle θy(n+1) for each arbitrary derricking angle interval. The path R(n+5) connecting the node P(n+4) and the node P(n+5) is a path through which the load W passes by the derricking of the boom 9. The path R(n+6) connecting the node P(n+4) and the node P(n+6) is a path through which the load W passes by the swiveling of the boom 9. The path R(n+7) connecting the node P(n+4) and the node P(n+7) is a path through which the load W passes by the swiveling and the derricking of the boom 9.

Figure 5C:
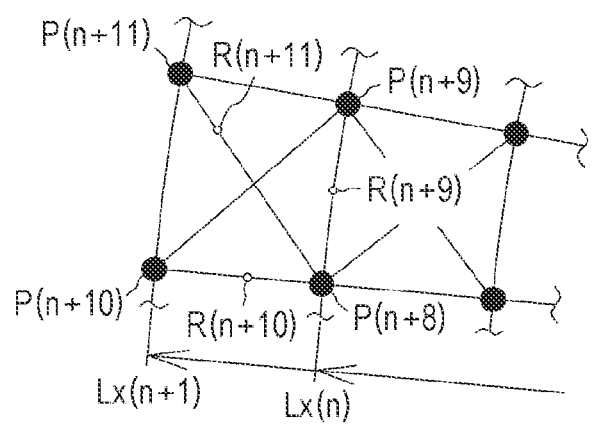

As illustrated in FIG. 5C, at the arbitrary derricking angle θz(n), the path generation unit 32b generates the paths connecting the node P(n+8) and the node P(n+9) of the load W generated by the swiveling of the boom 9 having the boom length Lx(n) in the clockwise direction for each arbitrary swiveling angle interval and the node P(n+10) and the node P(n+11) of the load W generated by the swiveling of the boom 9 having the boom length Lx(n+1) in the clockwise direction for each arbitrary swiveling angle interval. The path R(n+9) connecting the node P(n+8) and the node P(n+9) is a path through which the load W passes by the swiveling of the boom 9. The path R(n+10) connecting the node P(n+8) and the node P(n+10) is a path through which the load W passes by the extending and retracting of the boom 9. The path R(n+11) connecting the node P(n+8) and the node P(n+11) is a path through which the load W passes by the swiveling and the extending and retracting of the boom 9. In the path R(n+10) and the path R(n+11), it is assumed that control is performed such that fluctuation in a height direction due to the extension and retraction of the boom 9 is not caused by the winding-up and winding-down of the sub wire rope 16.

The plurality of paths R(n) generated in this manner includes a path of the load W transported by independent movements of the extension and retraction, the derricking, or the swiveling of the boom 9, and a path of the load W transported by a combination of a plurality of movements among the extension and retraction, the derricking, or the swiveling.

The transport path determination unit 32c of the control device 32 determines the transport path CR of the load W satisfying an actuation priority sequence of the actuators and a prescribed condition. The actuation priority sequence of the actuators is the swiveling hydraulic motor 81 for swiveling the boom 9, the derricking hydraulic cylinder 92 for derricking the boom 9, and the extension and retraction hydraulic cylinder 91 (not illustrated) for extending and retracting the boom 9. A first condition that is a prescribed condition of the present embodiment is to select a path that minimizes a transport time of the load W by an independent actuation of each actuator. A second condition which is a prescribed condition is to select a path for reducing a swiveling radius at the time of transporting the load W. In the present embodiment, the transport path CR is determined by the transport path determination unit 32c in a path on a plane in which the height direction of the load W is constant.

Figure 6:
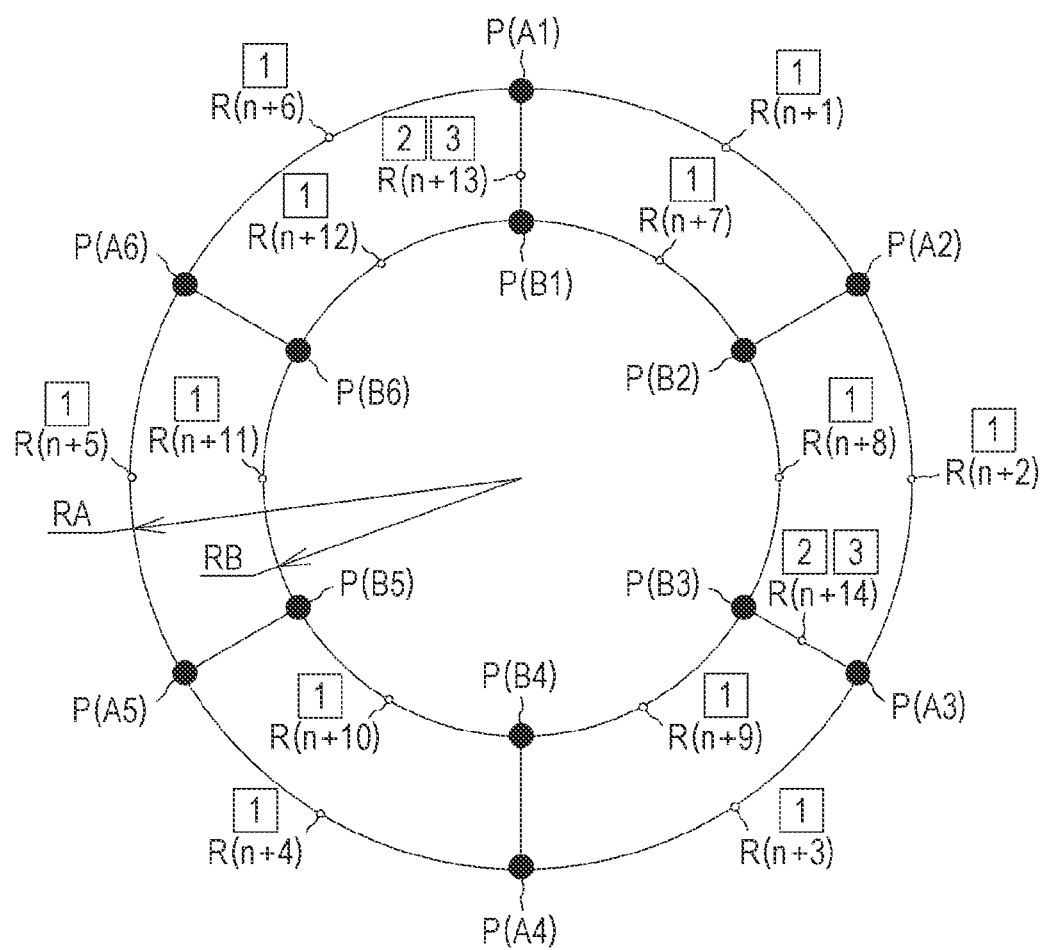
FIG. 6 is a diagram illustrating a weight based on a transport speed for each path.

As illustrated in FIG. 6, the paths generated by the path generation unit 32b is generated by connecting the node P(A1), the node P(A2), . . . , and the node P(A6) generated at equal intervals on a circumference of an arbitrary swiveling radius RA and the node P(B1), the node P(B2), . . . , and the node P(B6) generated at equal intervals on a circumference of an arbitrary swiveling radius RB to each other. The paths connecting the node P(A1) to the node P(A6) are the path R(n+1), the path R(n+2), . . . , and the path R(n+6). The paths connecting the node P(B1) to the node P(B6) are the path R(n+7), the path R(n+8) , . . . , and the path R(n+12). The path connecting the node P(A1) and the node P(B1) is defined as R(n+13). The path connecting the node P(A3) and the node P(B3) is defined as R(n+14). The path R(n+1) to the path R(n+12) are paths through which the load W is transported by the swiveling of the boom 9.

The path R(n+13) and the path R(n+14) are paths through which the load W is transported by the derricking or the extending and retracting of the boom 9.

The transport path determination unit 32c sets a weight regarding a transport time for each path in order to select the path R(n) satisfying the first condition. The transport path determination unit 32c sets weight 1 from the path R(n+1) to the path R(n+12) through which the load W is transported by the swiveling of the boom 9 with a highest transport speed (enclosed numerals in FIG. 6). Similarly, the transport path determination unit 32c sets weight 2 at the time of transport by derricking and weight 3 at the time of transport by extension and retraction (enclosed numerals in FIG. 6) for the path R(n+13) and the path R(n+14) through which the load W is transported by the derricking of the boom 9 having a second highest transport speed after the swiveling or the extension and retraction of the boom 9 having a lowest transport speed. That is, in the transport path CR including a combination of the plurality of paths R(n), as the total weight becomes smaller, the transport time becomes shorter.

Figure 7A:
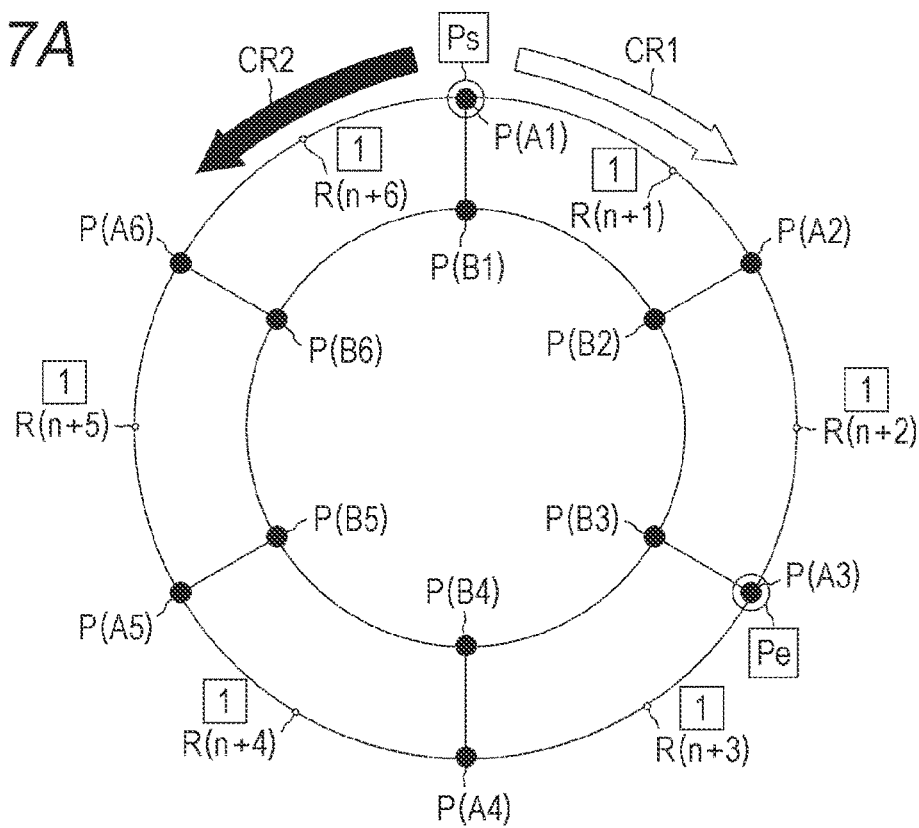
FIGS. 7A and 7B are diagrams illustrating an aspect of selecting a transport path.

As illustrated in FIG. 7A, when the node P(A1) is set as the lifting position Ps and the node P(A3) is set as the suspending position Pe, the transport path determination unit 32c determines a path having a smallest weight and connecting the node P(A1) and the node P(A3) by using the Dijkstra method or the like. The paths from the node P(A1) to the node P(A3) include a transport path CR1 (white arrow) connecting the path R(n+1) and the path R(n+2) through which the load W is transported by the swiveling of the boom 9 with a high priority sequence and a transport path CR2 (black arrow) connecting the path R(n+6), the path R(n+5), the path R(n+4), and the path R(n+3). Since the swiveling radius of the transport path CR1 and the swiveling radius of the transport path CR2 are the same, both the transport paths CR satisfy the second condition. The transport path determination unit 32c selects the transport path CR1 having a smaller total weight among the transport path CR1 having a total weight of 2 and the transport path CR2 having a total weight of 4 as the transport path satisfying the first condition.

Figure 7B:
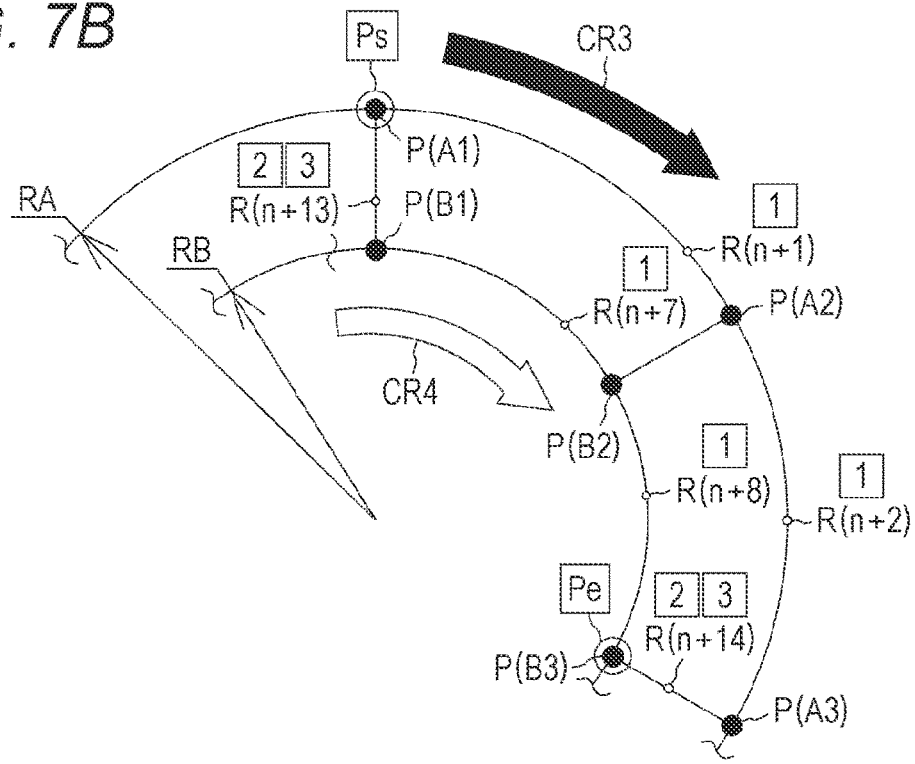

As illustrated in FIG. 7B, when the node P(A1) is set as the lifting position Ps and the node P(B3) is set as the suspending position Pe, the paths from the node P(A1) to the node P(B3) include a transport path CR3 (black arrow) having a swiveling radius RA connecting the path R(n+1), the path R(n+2), and the path R(n+14) through which the load W is transported by the swiveling of the boom 9 with a high priority sequence and the derricking of the boom 9 and a transport path CR4 (white arrow) having a swiveling radius RB connecting the path R(n+13), the path R(n+7), and the path R(n+8). The transport path determination unit 32c sets weight 2 by derricking for the path R(n+13) and the path R(n+14). Since the total weight of the transport path CR3 and the total weight of the transport path CR4 are both 4, both of the transport paths satisfy the first condition. The transport path determination unit 32c selects the transport path CR4 having a small swiveling radius RB as the transport path CR satisfying the second condition.

The transport control unit 32d of the control device 32 transmits a control signal Md to various switching valves of the crane device 6 so as to transport the load W along the transport path CR determined based on the priority sequence of the actuators. When the load W is transported along the transport path CR4, the transport control unit 32d derricks the boom 9 from the node P(A1) which is the lifting position Ps, and transports the load W to the node P(B1). Subsequently, when the load W reaches the node P(B1), the transport control unit 32d swivels the boom 9, and transports the load W to the node P(B3) which is the suspending position Pe via the node P(B2).

With this configuration, in the crane 1, it is possible to reduce the cost for path generation by generating the nodes P(n) and the path R(n) connecting the nodes P(n) only within the operable range Ar (see FIGS. 4A and 4B) determined by the weight Wg of the load W. In the crane 1, a combination of the transport path CR through which the load W is transported from the lifting position Ps to the suspending position Pe in a shortest time by using the actuator having a high priority sequence for the transport of the load W by the actuator and the actuator used when the load W is transported through the transport path CR is determined. That is, the crane 1 selects a combination of the actuators satisfying the first condition and the second condition based on the priority sequence of the actuators determined from the characteristics and the state of the operable range Ar. Accordingly, the load W can be transported through the optimum transport path CR in consideration of the actuation condition of the actuator.

In the present embodiment, the transport path determination unit 32c sets the weight of the path R(n) based on the actuation speed of each actuator, but may set the weight of the path R(n) based on the cost (fuel consumption) of each actuator. With this configuration, in the crane 1, the combination of the transport path CR through which the load W is transported from the lifting position Ps to the suspending position Pe at the minimum cost (minimum fuel consumption) by using the actuator having a high priority sequence for the transport of the load W by the actuator and the actuator used when the load W is transported through the transport path CR is determined. Accordingly, the load W can be transported through the optimum transport path CR in consideration of the actuation condition of the actuator.

The transport path determination unit 32c sets the selection of the path in the independent actuation of each actuator as the first condition, but may set the selection of the path R(n) by the combined actuation of each actuator as the first condition. With this configuration, in the crane 1, the transport path CR corresponding to the actuation timing of the plurality of actuators is determined. Accordingly, the load W can be transported through the optimum transport path CR in consideration of the actuation condition of the actuator. The node P(n) can be generated for each arbitrary interval in the winding and unwinding of the main winch 13 and the sub winch 15 and the tilting and the extension and retraction of the jib. That is, in the crane 1, it is possible to generate the path R(n) and the transport path RC based on the winding and unwinding of the main winch 13 and the sub winch 15 and the tilting and the extension and retraction of the jib.

The transport path determination unit 32c sets the selection of the path R(n) for reducing the swiveling radius at the time of transporting the load W as the second condition, but may set the selection of the path satisfying restriction such as a height at the time of transporting the load W and an entry prohibited area as the second condition. With such a configuration, in the crane 1, the transport path CR is determined in consideration of a situation and an operation content in the operable range Ar by using the actuator having a high priority sequence for the transport of the load W by the actuator. Accordingly, the load W can be transported through the optimum transport path CR in consideration of the actuation condition of the actuator.

Hereinafter, automatic generation control of the transport path CR of the load W by the control device 32 will be specifically described with reference to FIG. 8. The crane 1 according to the present embodiment may be configured to acquire the information regarding the operation and the space information of the operation area Aw from the external server computer or the like via the data communicator 31 or the like, but may be configured to acquire the space information of the operation area Aw by a laser scanner or the like and detect the weight Wg or the like of the load W from a weight sensor.

Figure 8:
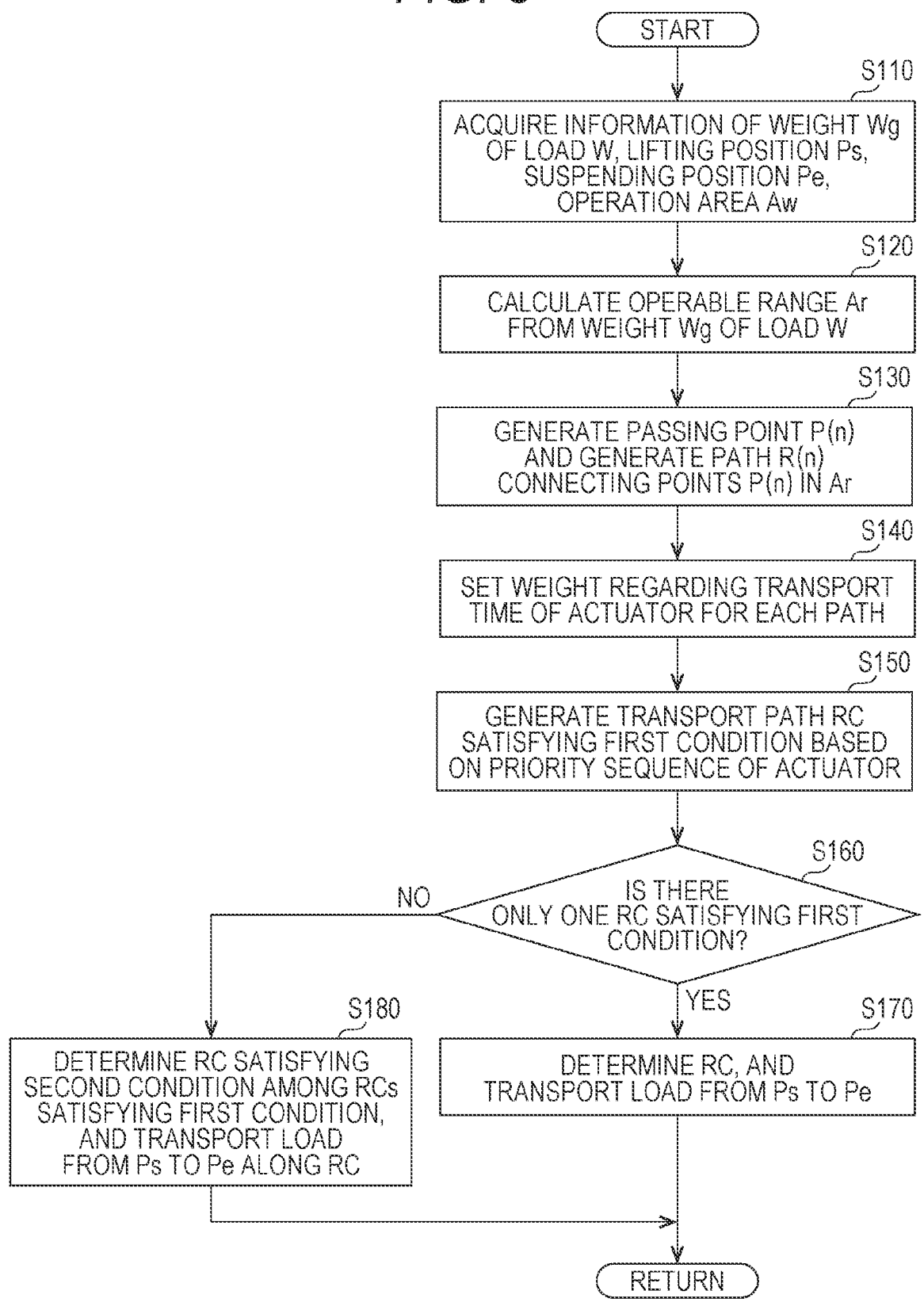
FIG. 8 is a diagram illustrating a flowchart for determining the transport path.

As illustrated in FIG. 8, in step S110 of the automatic generation control of the transport path CR of the load W, the control device 32 acquires the weight Wg of the load W, the lifting position Ps of the load W, the suspending position Pe of the load W, and the space information of the operation area Aw which are information regarding the work, and proceeds to step S120.

In step S120, the control device 32 calculates the operable range Ar from the acquired weight Wg of the load W, and proceeds to step S130.

In step S130, the control device 32 generates the nodes P(n) in the operable range Ar calculated in consideration of the acquired space information of the operation area Aw, generates the path R(n) connecting the adjacent nodes P(n), and proceeds to step S140.

In step S140, the control device 32 sets the weight regarding the transport time for each actuator used in each path, and proceeds to step S150.

In step S150, the, control device 32 generates the transport path CR satisfying the first condition based on the priority sequence of the actuator, and proceeds to step S160.

In step S160, the control device 32 determines whether or not there is only one transport path CR satisfying the first condition.

As a result, when there is only one transport path CR satisfying the first condition, the control device 32 proceeds to step S170.

On the other hand, when there is not only one transport path CR satisfying the first condition, that is, when there is a plurality of transport paths CR satisfying the first condition, the control device 32 proceeds to step S180.

In step S170, the control device 32 determines the generated transport path CR as the transport path CR of the load W, transports the load W along the determined transport path CR from the lifting position Ps to the suspending position Pe by the actuator based on the priority sequence, and proceeds to step S110.

In step S180, the control device 32 determines the transport path CR satisfying the second condition among the plurality of transport paths CR satisfying the first condition as the generated transport path CR, transports the load W from the lifting position Ps to the suspending position Pe along the determined transport path CR by the actuator based on the priority sequence, and proceeds to step S110.

As described above, the crane 1 generates the transport path CR satisfying the first condition and the second condition according to the priority sequence of the actuators within the operable range Ar. With this configuration, it is possible to generate an arbitrary transport path CR by independently changing the priority sequence of the actuators, the first condition, and the second condition.

In the present embodiment, the crane 1 acquires the space information of the operation area Aw, the information regarding the operation, and the like from the external server computer or the like and automatically generates the transport path CR of the load W in the control device 32, but may be configured to acquire the transport path CR of the load W generated in a path generation system 33 provided in an external server computer 35.

Figure 9:
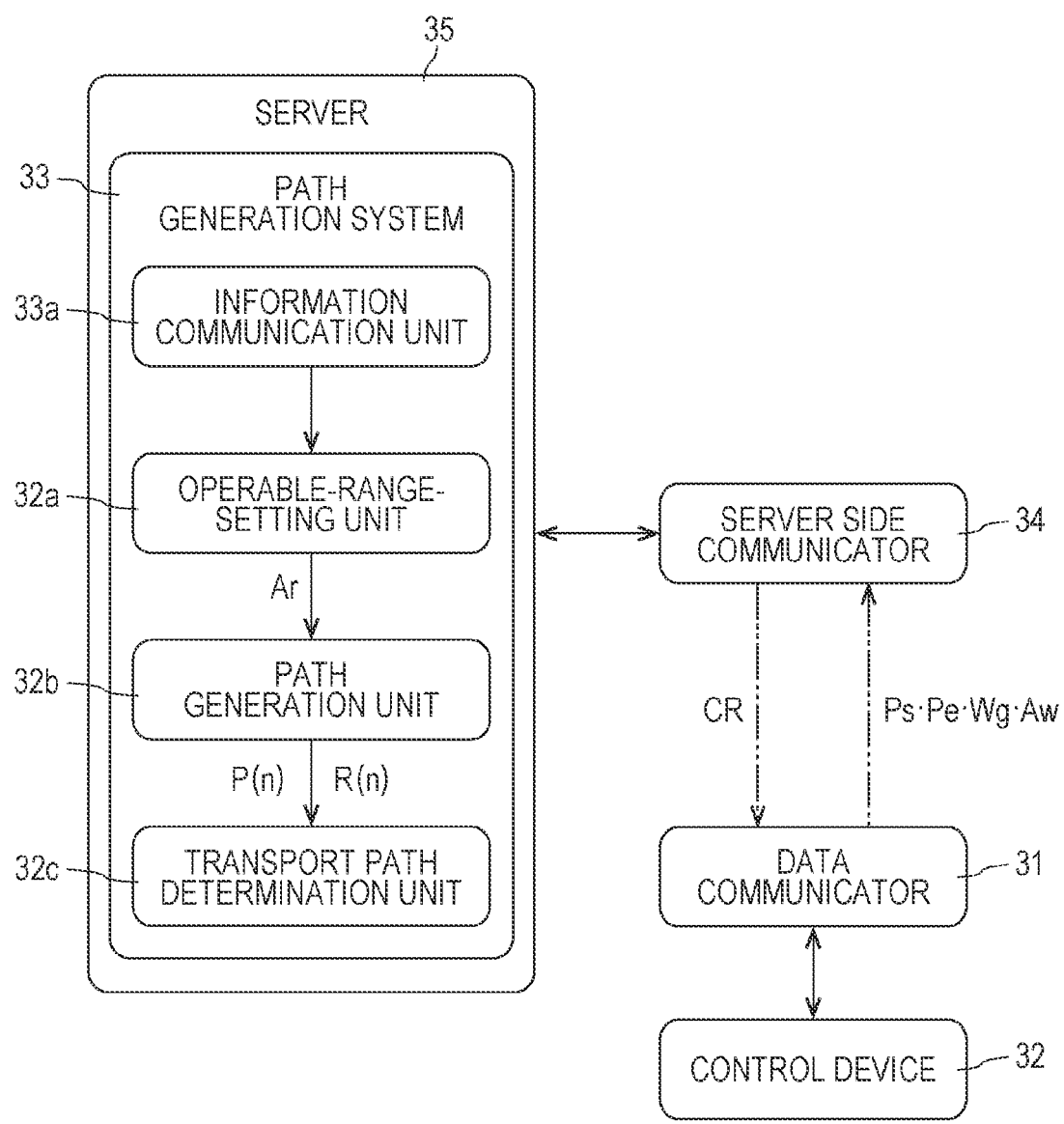
FIG. 9 is a block diagram illustrating a control configuration of path generation is a server computer.

As illustrated in FIG. 9, the path generation system 33 automatically generates the transport path CR of the load W by the crane 1. The path generation system 33 is provided in the server computer 35 including a server computer side communicator 34, and is connected to the control device 32 of the crane 1 via the data communicator 31. The path generation system 33 includes an information communication unit 33a, an operable-range-setting unit 32a, a path generation unit 32b, and a transport path determination unit 32c. The following path generation system 33 is applied instead of the crane 1, and the names, drawing numbers, and reference signs used in the description thereof are used to indicate the same components. In the following embodiment, a specific description of the same points as those of the already described embodiment will be omitted, and different points will be mainly described.

The information communication unit 33a acquires various kinds of information from the crane 1 and transmits the various kinds of information to the crane 1. The information communication unit 33a acquires the positional information of the crane 1, the machine body information of the crane 1, the information regarding the operation, and the like from the control device 32 of the crane 1 by using the server computer side communicator 34. The information communication unit 33a transmits the transport path CR determined by the transport path determination unit 32c to the crane 1.

The operable-range-setting unit 32a sets the operable range Ar on the virtual space in the server computer 35 from the weight Wg of the transported load W acquired by the information communication unit 33a. The operable-range-setting unit 32a acquires the lifting position Ps, the suspending position Pe, the weight Wg of the load W, and the space information of the operation area Aw (see FIG. 3) which are the information regarding the operation acquired by the information communication unit 33a. The operable-range-setting unit 32a calculates the operable range Ar (see FIG. 3), which is a space in which the crane 1 can transport the load W from the machine body information of the crane 1 and the weight Wg of the load W.

The path generation unit 32b generates all the nodes P(n) through which the load W can pass in the operable range Ar (see FIGS. 4A and 4B). The node P(n) is represented by three-dimensional coordinates. At this time, since the space occupied by the feature is not included in the operable range Ar, the node P(n) is not generated by the path generation unit 32b.

The path generation unit 32b generates all the paths R(n) through which the load W can pass in the operable range Ar (see FIGS. 5A, 5B, and 5C). For example, the path R(n) connects the plurality of nodes P(n) through which the load W suspended in a state in which the sub wire rope 16 is wound up the most can pass. The transport path determination unit 32c determines the transport path CR of the load W satisfying the actuation priority sequence of the actuator and the prescribed condition.

The path generation system 33 transmits the transport path CR calculated in the virtual space of the server computer 35 to the control device 32 of the crane 1 by using the server computer side communicator 34. The control device 32 controls each actuator of the crane 1 based on the information of the transport path CR acquired from the path generation system 33. With such a configuration, the path generation system 33 acquires the positional information of the crane 1, the machine body information of the crane 1, and the information regarding the operation, and calculates the transport path CR by using the server computer 35 having sufficient calculation capability. Accordingly, the path generation system 33 can suppress a calculation amount of the control device 32 of the crane 1 of which the calculation capability is restricted.

The aforementioned embodiment merely illustrates an example of a representative form, and can be implemented by being variously modified without departing from the gist of one embodiment. The aforementioned embodiment can be implemented in various forms. The scope of the present invention is indicated by the description of the claims, and further includes equivalent meanings described in the claims and all modifications within the scope.

INDUSTRIAL APPLICABILITY

The present invention is applicable to a crane and a path generation system for a crane.

REFERENCE SIGNS LIST

1 Crane
8 Swiveling base
9 Boom
32 Control device
32a Operable-range-setting unit
32b Path generation unit
32c Transport path determination unit
81 Swiveling hydraulic motor (actuator)
91 Extension and retraction hydraulic cylinder (actuator)
92 Derricking hydraulic cylinder (actuator)
W Load
Ar Operable range
P(n) Node
R(n) Path
CR Transport path

The invention claimed is:

1. A crane comprising:
a swiveling base;
a boom provided at the swiveling base and capable of derricking and extending/retracting;
a plurality of actuators which swivel, derrick and extend/retract the boom; and
a computer programmed to:
set an operable range in which a load to be transported is capable of being transported, based on a weight of the load;
generate a plurality of nodes through which the load is able to pass and a plurality of paths connecting the nodes adjacent to each node within the set operable range; and
determine a transport path of the load from the plurality of generated nodes and the plurality of generated paths, the transport path including a combination of paths each made by a combined actuation of two or more actuators selected from among the plurality of actuators or an independent actuation of each actuator selected from among the plurality of actuators,
wherein the computer is further programmed to set a weight for each of the plurality of generated paths regarding speed or fuel consumption of transport, and select, from candidates for the transport path, a candidate having a total weight indicating a shortest transport time or a smallest fuel consumption.

2. A path generation system for a crane which comprises: a swiveling base; a boom provided at the swiveling base and capable of derricking and extending/retracting; and a plurality of actuators which swivel, derrick and extend/retract the boom, the path generation system comprising a computer programmed to:
acquire, from the crane, positional information of the crane, machine body information of the crane, a lifting position and a suspending position of a load, and a weight of the load, and transmit, to the crane, a transport path of the load;
set an operable range in which the load is capable of being transported, based on the weight of the load;
generate a plurality of nodes through which the load is able to pass and a plurality of paths connecting the nodes adjacent to each node in the set operable range; and
determine a transport path of the load from the plurality of generated nodes and the plurality of generated paths, the transport paths including a combination of paths each made by a combined actuation of two or more actuators selected from among the plurality of actuators or an independent actuation of actuation of each actuators selected from among the plurality of actuators,
wherein the computer is further programmed to set a weight for each of the plurality of generated paths regarding speed or furl consumption of transport, and select, from candidates for the transport path, a candidate having a total weight indicating a shortest transport time or a smallest fuel consumption.

* * * * *